United States Patent [19]
Bozek

[11] 3,789,664
[45] Feb. 5, 1974

[54] FLUID FLOW RANGE INDICATING APPARATUS

[76] Inventor: John W. Bozek, 6093 Waterfront Dr., Waterford, Mich. 48095

[22] Filed: Aug. 27, 1971

[21] Appl. No.: 175,638

[52] U.S. Cl............................... 73/209, 73/210
[51] Int. Cl............................................. G01f 1/00
[58] Field of Search............................ 73/209, 210

[56] References Cited
UNITED STATES PATENTS
2,941,401  6/1960  Streeter .............................. 73/210

*Primary Examiner*—Herbert Goldstein
*Attorney, Agent, or Firm*—James P. Meloche

[57] ABSTRACT

A device utilizing a variable area flowmeter combined with a vertical concentric cylinder having a piston therein which is rigidly attached to the plummet of the variable area flowmeter. Fluid pressure upstream of the plummet is ported to the top of the piston and fluid pressure downstream from the plummet is ported to the bottom of the piston. Ports selectively placed in the cylinder wall feed pressurized fluid to indicating gauges as means of sensing the relative position of the piston, thereby indicating the flow rate range.

8 Claims, 10 Drawing Figures

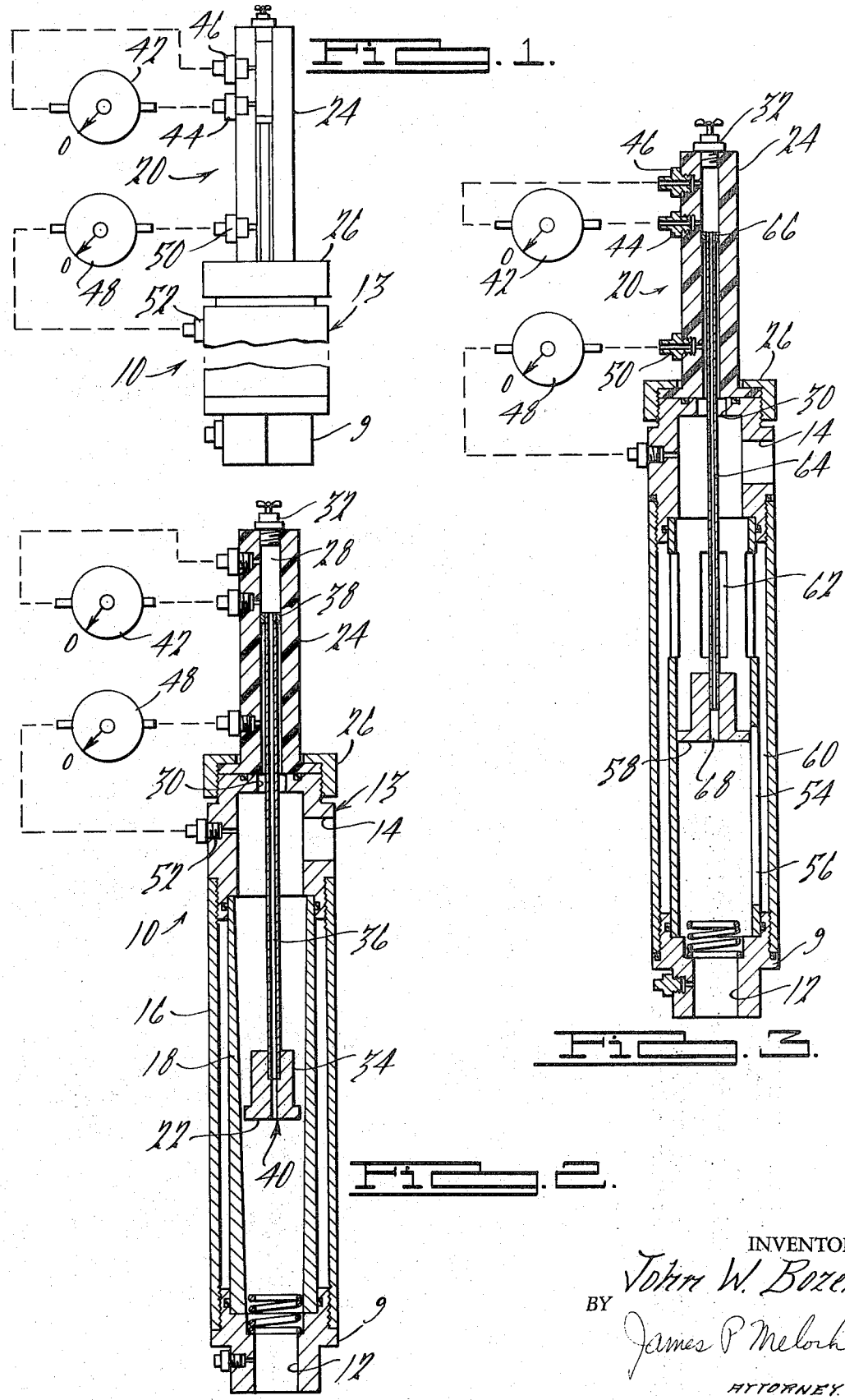

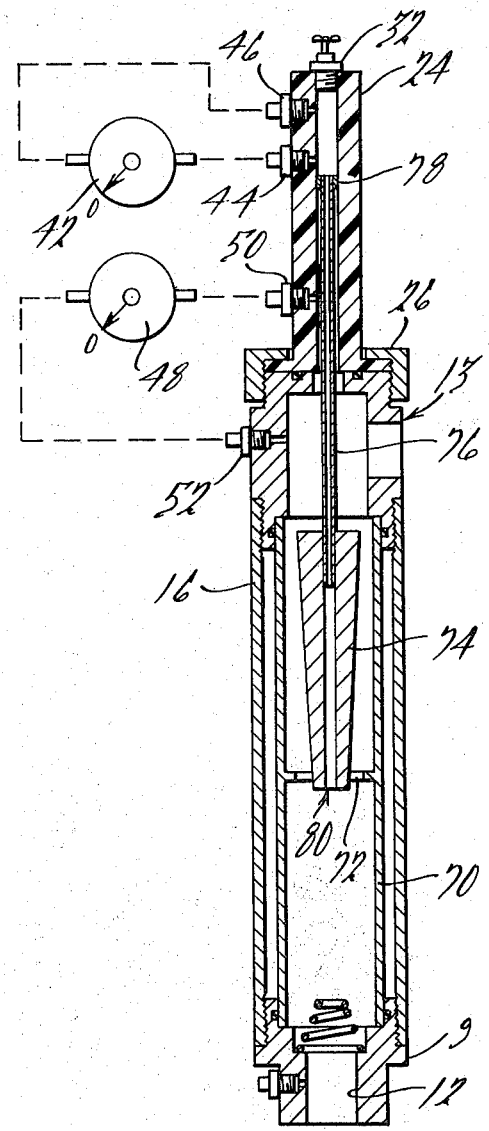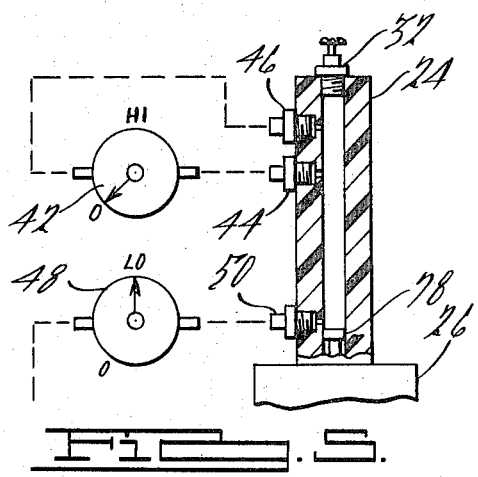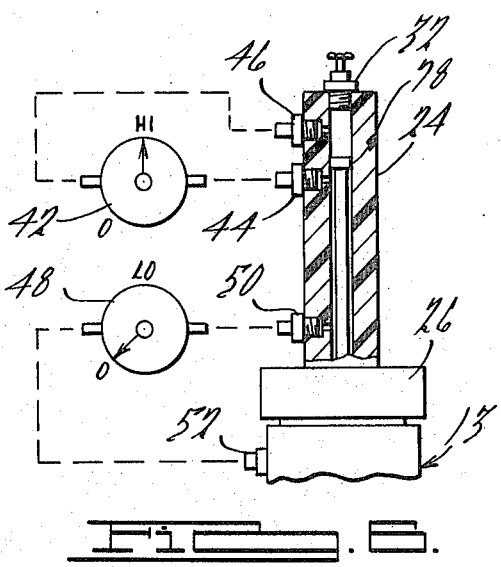

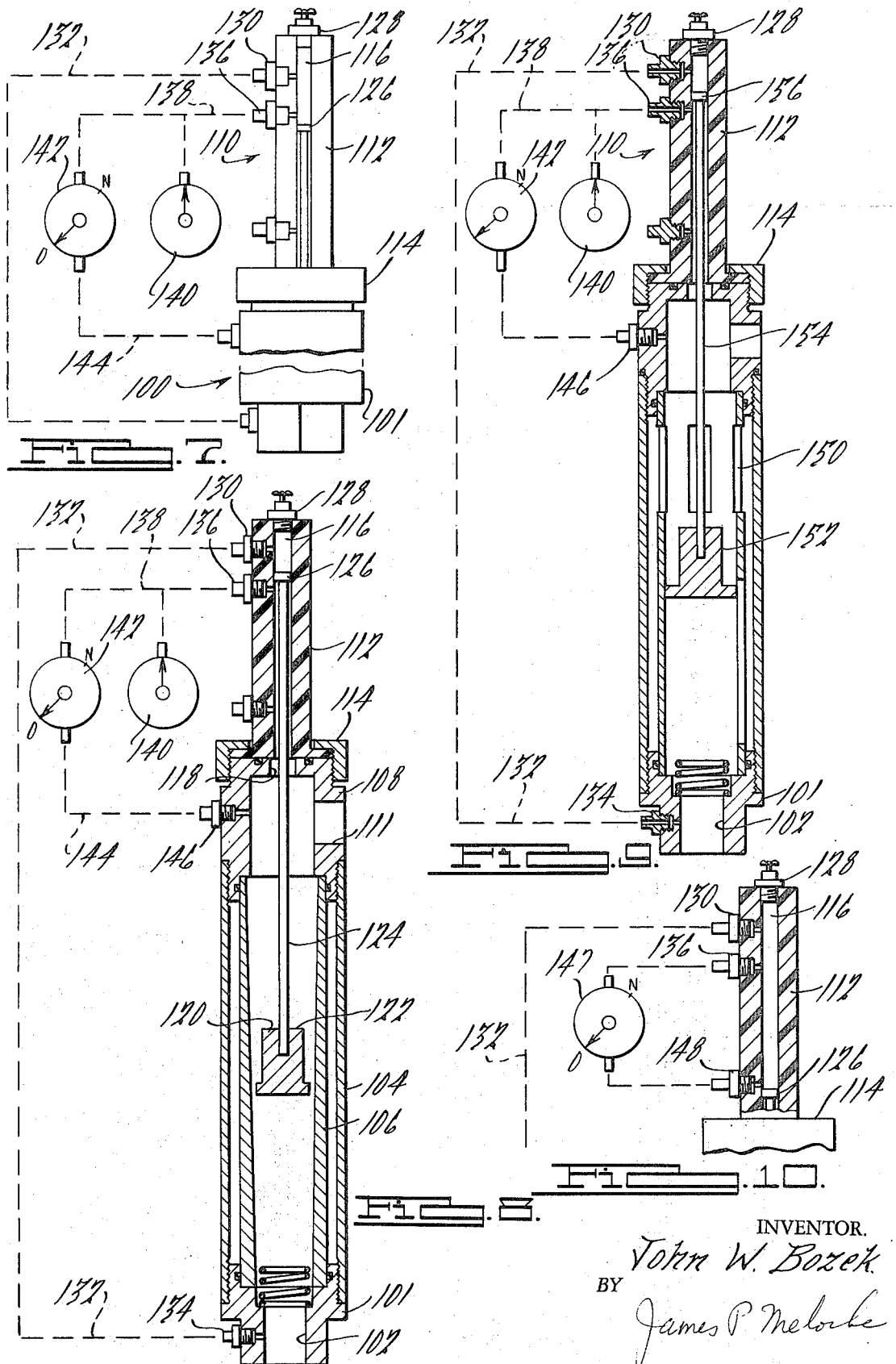

FLUID FLOW RANGE INDICATING APPARATUS

DISCLOSURE

This invention relates to the field of fluid flow indicators having devices to remotely indicate the achieving of a certain rate of flow and more particularly those fluid flow indicators that may indicate the existence or non-existence of the desired rate of flow by entirely hydraulic means at a place remote from the actual flowing fluid.

The invention relates to the field of variable area flowmeters of the type that measure the mass rate of flow of the fluid by the position of a weighted plummet operating vertically in the flowing fluid to regulate a variable area escape port.

There are three examples of variable area flowmeters illustrated in this disclosure wherein the weighted plummet includes a rod and piston and the piston rides in a second cylinder usually above the rest of the plummet. A rod extension on a plummet without the piston has been used heretofore as a visible indicator pointer to scale the flow rate. Remote reading devices based on magnets and followers have been applied to the rod extension for remotely indicating the plummet position.

By the new and novel construction of this invention the rod tip comprises a piston and the upper cylinder comprises a selectively ported cylinder wall; and there is provided conduits providing upstream pressure always to the top of the piston and downstream pressure always to the bottom of the piston; and a hydraulic pressure may be read at the selected ports in the wall thus indicating the flow rate. The conduits providing upstream pressure to the top of the piston are in one construction external to the plummet and in another construction are internal to the plummet structure.

The novel construction of my invention provides a completely self contained, all hydraulic, flowing fluid energy activated, remote indicating, fluid flow rate indicator.

With the foregoing brief summary in view, together with such other objects and advantages as may subsequently appear, the invention resides in the parts and in the combination, construction and arrangement of parts hereinafter described and claimed, and illustrated by way of example in the accompanying three sheets of drawings bearing ten figures, in which:

FIG. 1 is an overall view of a remote indicating flowmeter of this invention showing one configuration of the indicating gauges with the center part of the flowmeter cut out to shorten the figure.

FIG. 2 is a vertical cut-away view of the flowmeter of FIG. 1, illustrating the plummet in a tapered tube flowmeter and the internal conduit passing through the plummet.

FIG. 3 is a cut-away view of the meter of FIG. 1 illustrating a piston in a sloted cylinder alternative construction and the internal conduit passing through the plummet.

FIG. 4 is a cut-away view of FIG. 1 illustrating a tapered plug in an orifice alternative construction for the meter of FIG. 1, showing the internal conduit.

FIG. 5 is a view of the top of the meter illustrated in FIG. 1 illustrating the gauges when the flow is below the normal limits.

FIG. 6 is a view of the top of the meter of FIG. 1 illustrating the gauges when the flow is higher than normal.

FIG. 7 is an overall view of a meter of this invention using an exterior fluid conduit; the figure is shortened by cut out of the center part of the flowmeter.

FIG. 8 is a cut-away view of the meter of FIG. 7 using a plummet in a tapered tube variable area flowmeter.

FIG. 9 is a cut-away view of FIG. 7 illustrating a piston in a sloted cylinder alternative construction for the variable area flowmeter.

FIG. 10 is a view of the meter of FIG. 7 illustrating an alternative construction for the arrangement of the indicated gauges.

As best viewed in FIG. 1 the remote indicating flowmeter of this invention is made up of a variable area flowmeter section, 10, and a remote indicator section, 20.

The variable area flowmeter section, 10, has an inlet port, 12, in the base, 9, and an outlet port, 14, in the top, 13, as shown in FIG. 2. FIGS. 2, 3, and 4 illustrate three different types of variable area flowmeters that may be used in section, 10.

With reference to FIG. 2, it will be seen that base, 9, is joined to top, 13, by a suitable outer casing, 16. A tapered tube, 18, is disposed fluid tight between inlet, 12, and outlet, 14, and plummet, 22, is freely movable vertically in tapered tube, 18. The fluid to be measured flows into inlet, 12, vertically up through the inside of tube, 18, around plummet, 22, and out through outlet, 14. The details of construction of this type of variable area flowmeter are well known to those skilled in the art. Therefore, it is deemed unnecessary to more fully explain its construction.

Referring to FIG. 2, the structure of indicator, 20, will be understood as being made up of a cylindrical transparent indicator body, 24, mounted on the top of top, 13, and held fluid tight in place by screw cap, 26.

Indicator body, 24, has a bore, 28, passing from bottom to top communicating to the inside of top, 13, by means of passageway, 30, therein. An air-bleed, 32, is shown capping the top of bore, 28, and will be normally closed. Plummet, 22, is made up of a weighted head, 34, an extension tube, 36, secured to the weighted head by suitable means and a piston, 38, secured to the top of tube, 36. A passage-way, 40, of sufficient diameter to allow fluid to flow through is provided through the weighted head, 34, through the tube, 36, through the piston, 38, whereby some of the fluid entering inlet, 12, may pass through passageway, 40, to supply high pressure fluid to the top of piston, 38, in cylinder, 28. The flowing fluid being measured has a higher pressure below the weighted plummet, 34, than exists in the fluid leading to outlet, 14. The low pressure known as the outlet pressure will exist in bore, 28, below piston, 38, since the fluid communicates into this region by passageway, 30. It is, therefore, understood that at all times within the range of the meter the fluid pressure upstream of weighted plummet, 34, will exist on the top of piston, 38, and the fluid pressure downstream from weighted head, 34, will exist below piston, 38.

When fluid is flowing into inlet, 12, plummet, 22, will rise to equilibrium position depending on the rate of flow and if the rate of flow decreases, plummet, 22, will fall to a new lower equilibrium position, causing piston, 38, to move lower, but if the fluid flow should rise, plummet, 22, will rise to a new equilibrium position causing piston, 38, to rise to a higher position.

Referring to FIGS. 1 and 2 it will be seen that a pressure drop gauge, 42, is connected by suitable tubing to ports, 44 and 46, in cylinder, 24, so that gauge, 42, may read the pressure difference in bore, 28, between port, 44, and port, 46. Since pressure difference is being read there is no flow of fluid through gauge, 42, and gauge, 42 may be very remote from the other structure of FIG. 1.

When piston, 38, is below port, 44, port, 44, and port, 46, are subjected to the high pressure existing on the top side of piston, 38, and the pressure gauge, 42, indicates zero as illustrated in FIG. 1. When the piston, 38, is between ports, 44, and 46, pressure gauge, 42, indicates a pressure drop as illustrated in FIG. 6. This activity of guage, 42, is a signal that a fluid flow rate has reached the point which, for example, is the high limit and corrective action can be taken.

As best viewed in FIGS. 1 and 2 a second pressure drop gauge, 48, is connected by suitable tubing to port, 50, in cylinder, 24, and port, 52, in top, 13. When piston, 38, is above port, 50, there is no pressure difference between ports, 50, and 52, and gauge, 48, indicates zero as shown in FIG. 1. When the fluid flow rate falls to such a low point that piston, 38, falls below port, 50, as shown in FIG. 5, then gauge, 48, indicates the pressure difference existing between ports, 50, and 52, thereby notifying the user that the fluid flow is at its lower limit and corrective action should be taken. It will be understood that the positions of the ports, 44, 46, 50, and 52, may be varied to achieve the desired flow rate at which an indication will be given for either the high or the low flow. While the flow is such that piston, 38, remains between ports, 44, and 50, gauges, 42, and 48, remain at the zero position. When the flow rate increases so that piston, 38, passes port, 44, then gauge, 42, indicates this event. If the flow rate should decrease so that piston, 38, flows below port, 50, then gauge, 48, indicates this event.

In FIGS. 1 through 6 the pressure drop gauges illustrate either no reading indicated by a zero on the gauge or a positive reading indicated by HI on gauge, 42, and LO on gauge, 48. An ordinary pressure gauge could be applied to port, 50, or port, 44, and this pressure gauge would sense the pressure change when piston, 38, passed over the port.

FIG. 3 illustrates the construction of the remote indicator meter which is the same arrangement as FIG. 1 except for the use of the different types of variable area flowmeter. In FIG. 3 an inner cylinder, 54, having a slot, 56, is disposed between the base, 9, and top, 13. A weighted piston, 58, is freely movable up and down inside of cylinder, 54, and will assume an equilibrium position relative to slot, 56, depending on the flow rate of the fluid through the meter. The fluid being measured will flow into inlet, 12, through slot, 56, into chamber, 60, through slots, 62, and exit via outlet, 14. The details of construction of the piston in a sloted cylinder are well known to those skilled in the art. The piston, 58, has fastened thereto, a tube, 64, which is fastened to piston, 66. Piston, 66, tube, 64, and piston, 58, having a passageway, 68, passing through which functions in the same manner as passage, 40, in FIG. 1. Piston, 66, is equivalent to piston, 38, in FIG. 1 and tube, 64, is equivalent to tube, 36, in FIG. 1 and the operation of device FIG. 3 is the same as described for FIG. 1 with the only difference being the type of variable area flowmeter.

FIG. 4 illustrates the details of construction of a third type of variable area flowmeter which may be substituted for the plummet in a tapered tube illustrated in FIG. 1. In FIG. 4, a cylinder, 70, is disposed between base, 9, and top, 13, and an orifice, 72, attached to cylinder, 70, is horizontally disposed so that tapered plug, 74, may move up and down in orifice, 72, varying the area of orifice, 72. The fluid flows into inlet, 12, through orifice, 72, raising tapered plug to an equilibrium position and thence flows around plug, 74, and out through outlet, 14. Tapered plug, 74, has fastened thereto a tube, 76, which has secured to its top a piston, 78, and a passageway, 80, extends through plug, 74, tube, 76, and piston, 78, in the same manner as passageway, 40, in FIG. 1. Piston, 78, is functionally identical to piston, 38, in FIG. 1 and tube, 76, is functionally identical to tube, 36, in FIG. 1. The high pressure fluid flows through the passage, 80, to the top of piston, 78, and the low pressure fluid flows into the bottom of piston, 78, in the same manner as illustrated in FIG. 1. The operation of the device of FIG. 4 is identical in all respects with the meter of FIG. 1 except in the difference in the variable area of flowmeter construction. The orifice and tapered plug meter basic construction without passage, 80, is understood to be well known to those skilled in the art.

FIG. 7 is an over-all view of the remote indicating meter of this invention of a speciies different from that of FIG. 1 in the details of construction relating to the manner in which the high pressure fluid is fed to the top of the piston in the indicating body. It will be noted that all of the illustrations in this application have been made uniform as to their exterior details to better illustrate the difference between the five species being shown. In FIGS. 1 through 6 the high pressure fluid is fed to the tops of cylinders, 38, 66, and 78, by means of an interior passageway whereas in FIGS. 7, 8, and 9, the high pressure fluid is fed to the top of the respective indicated pistons by means of passageway exterior to the plummets of the variable area flowmeter.

A detailed description of the invention as illustrated in FIGS. 7, 8, 9, and 10, will begin with a description of FIGS. 7 and 8, wherein the invention consists of variable area flow meter body, 100, and an indicating body, 110. Base, 101, tapered tube, 106, and top, 108, are held in fluid tight arrangement by outer case, 104. Tapered tube, 106, provides a fluid passage from inlet, 102, to outlet, 111. A transparent cylinder, 112, is clampingly fastened fluid tight to the top of outlet, 108, by means of thread cap, 114. A cylindrical bore, 116, passes through cylinder, 112, and communicates to the interior of top, 108, through bore, 118.

A plummet, 120, made up of a weighted head, 122, which is fastened to rod, 124, and which is topped by a piston, 126, is free to move up and down in the tapered tube, 106, and in bore, 116. Bore, 116, is closed at the top by an air-bleed, 128. A port, 130, communicates from bore, 116, by means of conduit, 132, to port, 134, in base, 101, whereby the fluid pressure from inlet, 102, is fed to bore, 116, through port, 130. Fluid pressure at the top, 108, is fed through bore, 118, into cylinder, 116. The fluid inlet pressure is higher than the the fluid outlet pressure and they are separated in cylinder, 116, by means of solid piston, 126. A second port, 136, communicates from cylinder, 116, by means of conduit, 138, to pressure guage, 140. There is also illustrated a second pressure drop gauge, 142, which is connected to conduit, 138, and conduit, 144, which is connected to port, 146, in top, 108.

When the fluid flow is such as to position plummet, 120, as illustrated in FIG. 8 the piston, 126, is between ports, 130, and 136, and gauge, 142, reads zero and gauge, 140, reads the lower pressure downstream of the plummet, 120. If the flow rate should drop so that piston, 126, falls below port, 136, then high pressure fluid from port, 130, will pressurize port, 136, and conduit, 138, and gauge, 142, will read the pressure drop across plummet, 120, and gauge, 140, will read the higher pressure upstream of piston, 120. Gauge, 140, being a gauge pressure type gauge will have a small change in reading whereas gauge, 142, being a pressure drop gauge will have a large change in reading. Gauge, 142, is preferred since it acts as a binary gauge. It is readily apparent that positioning of ports in various locations along the length of cylinder, 112, enables the user to obtain an indication of the position of piston, 126, for purposes of remotely indicating the flow rate which governs the position of piston, 126.

Another example of the indicator gauge arrangement is shown in FIG. 10. FIG. 10 is a partial view of FIG. 7 to illustrate the alternative gauge. Port, 146, is plugged and gauges, 142, 140, are removed. Pressure drop gauge, 147, is connected by fluid conduit across port, 136, and port, 148. When the flow rate is high and piston, 126, is above port, 136, the pressure drop gauge, 147, will read zero; when the flow is very low so that piston, 126, is below port, 148, the pressure drop gauge, 147, will also read zero. When the flow is such that piston, 126, is between port, 136, and port, 148, the pressure drop gauge will indicate full reading thus notifying the user that flow rate is positively between two fixed limits. It is apparent that the use of the series of gauges arranged like gauge, 147, would give a positive indication of high or low or any range of flow rates in between.

FIG. 9 illustrates an alternative construction for use in the meter of FIG. 7 in that the variable area flow meter instead of being a plummet in a tapered tube as shown in FIG. 8 is a piston in a slotted cylinder type. The base, 101, has mounted thereon a cylinder, 150, and a piston, 152, having a rod, 154, capped by a piston, 156, freely slides up and down in the normal manner of flow meters of this type. All aspects of this operation of the meter of FIG. 9 are the same as the meter of FIG. 8 except for those differences that are inherent characteristics of the variable area flow meter itself.

We have therefore, described five species of this invention illustrating two primary species one of which is the meters of FIGS. 1 thru 6 wherein the high pressure fluid is conducted to the indicating gauges by means of passageway that is interior to the floating weighted plummet, whereas the second primary species is illustrated in FIGS. 7 to 10, and external tubing is used to conduct the high pressure fluid to the gauges. In the second primary species the external tube illustrated would also include passageways in the walls and bodies of the device which would duplicate the external tubing function.

In the first primary species we have three subspecies in the construction of the meter using three different variable area flow meters. In the second primary species we have illustrated the invention using two different variable area flow meters. It is contemplated that the tapered plug and orifice from our meter may be applied to the second primary species.

It will be understood that other types of pressure transducers could be used in place of the gauges shown. These alternate devices could be used to trigger visual or aural alarms, actuate valves, turn off pumps or in other ways affect the associated system.

Having thus described my invention there will be modifications that are readily apparent to those skilled in the art and I, therefore, intend not to be held to the exact details of the invention disclosed but only to be limited by the scope of the claims that follow:

I claim:

1. A device to remotely indicate that the flow rate is above or below a certain rate of flow; comprising, a body, through which the fluid being measured flows, including a first section which is a variable area flowmeter housing having an inlet at the bottom and an outlet at the top for the flowing fluid being measured, and including a second section being a cylindrical coaxial extension from said first section; and a weighted member, freely reciprocating up and down in said body in response to said fluid flow rate, including a plummet member disposed within said first section and a piston portion disposed within said second section to form a piston in a cylinder; and, conduit means for providing fluid pressure from the said body outlet to the extremity of the said cylindrical coaxial extension; and, conduit means for providing fluid pressure from the said body inlet to the oppssit extremity of the said coaxial extension; and at least one port in the cylindrical coaxial extension leading to the outside and being situated tp read the fluid pressure downstream of the said plummet member when the piston portion is on one side of this port and to read the upstream pressure of the said plummet member when the piston portion is on the other side of this port; and a fluid light conduit leading from each of said ports to a pressure indicator.

2. A device for remotely indicating a change in the rate of fluid flow; comprising, a variable area flow meter of the type having a weighted body vertically moveable responsive to the rate of fluid flow, and said weighted body including vertically extending rod and a piston; and, a vertical housing, secured to said variable area flow meter, in which said piston may freely slide in the normal manner of a piston in a cylinder; and, a conduit means providing a passageway for the inlet fluid to the variable area flow meter to be fed to one side of the said piston; and, a conduit means providing a passageway for the outlet fluid from the variable area flow meter to be fed to the other side of the said piston; and, a port in the wall of said housing located between the extreme movements of travel of the piston in the normal operation of the flow meter; and, a fluid pressure indicating device remotely located from the variable area flow meter joined to said port by means of a fluid conduit.

3. A device for remotely indicating a change in the rate of fluid flow; as described in claim 2 wherein said variable area flowmeter is the plummet in a tapered tube type.

4. A device for remotely indicating a change in the rate of fluid flow; as described in claim 2 wherein said variable area flowmeter is the piston in a slotted cylinder type.

5. A device for remotely indicating the change in the rate of fluid flow; as described in claim 2 wherein the said variable area flowmeter is the tapered plug in an orifice type.

6. A remote indicating fluid flow meter of the variable area type; comprising,
   a base provided with an opening for fluid inlet; and
   an upperly extending outwardly tapering vertical tube mounted on said base; and
   an outlet cap on the top of said tapering tube having an extension vertically upward and coaxial with said tapered tube for providing a cylinder of the same length as the tapered tube; and,
   a weighted plummet including a head disposed within said tapered tube and a piston disposed within said vertical cylinder joined by a rigid member; and,
   means for closing the top of said cylinder; and,
   a conduit for providing fluid passageway from the inlet side of said variable area flow meter to the top of said vertical cylinder; and,
   a conduit for providing fluid passageway from the outlet side of said variable area flow meter to the bottom of said vertical cylinder; and,
   a port leading from the inside of said vertical cylinder located between the extremities of travel of said piston in said vertical cylinder; and,
   means for reading the pressure at this port.

7. The remote indicating fluid flow meter as described in claim 6 wherein said conduit for providing fluid from said inlet to the top of said cylinder is disposed internal to said plummet.

8. The remote indicating fluid flowmeter of claim 6 wherein said conduit for providing fluid from said inlet to the top of said cylinder is an external tube leading from said inlet to the top of said vertical cylinder.

* * * * *